United States Patent
Yasuda et al.

(10) Patent No.: US 6,728,683 B1
(45) Date of Patent: Apr. 27, 2004

(54) REPRODUCING APPARATUS AND REPRODUCING METHOD

(75) Inventors: Ryohei Yasuda, Kanagawa (JP); Tomohiro Koyata, Tokyo (JP)

(73) Assignee: Sony Corporation, Tokyo (JP)

( * ) Notice: Subject to any disclaimer, the term of this patent is extended or adjusted under 35 U.S.C. 154(b) by 772 days.

(21) Appl. No.: 09/636,567

(22) Filed: Aug. 10, 2000

(30) Foreign Application Priority Data

Aug. 23, 1999 (JP) .......................................... P11-235517
Nov. 15, 1999 (JP) .......................................... P11-324199

(51) Int. Cl.$^7$ ............................................. G10L 21/00
(52) U.S. Cl. ..................... 704/500; 704/201; 369/47.43
(58) Field of Search .................... 704/201, 500–504; 369/30.07, 47.29, 47.43

(56) References Cited

U.S. PATENT DOCUMENTS

| | | | |
|---|---|---|---|
| 5,495,552 A | * | 2/1996 | Sugiyama et al. .......... 704/201 |
| 5,666,451 A | * | 9/1997 | Kim .............................. 386/97 |
| 5,689,704 A | * | 11/1997 | Yoshida et al. ............. 711/111 |
| 5,761,642 A | * | 6/1998 | Suzuki et al. ............... 704/503 |
| 5,905,697 A | * | 5/1999 | Yamashita ................. 369/30.07 |
| 6,353,584 B1 | * | 3/2002 | Koyata ..................... 369/47.13 |

FOREIGN PATENT DOCUMENTS

EP 0 847 155 A2 6/1998

OTHER PUBLICATIONS

Anonymous, "Dynamic Range Compression and/or Expansion During Subband Decoding," Research Disclosure, Kenneth Mason Publications, vol. 375, No. 43, Jul. 1995, 3 pp.

* cited by examiner

Primary Examiner—Richemond Dorvil
Assistant Examiner—Abul K. Azad
(74) Attorney, Agent, or Firm—Oblon, Spivak, McClelland, Maier & Neustadt, P.C.

(57) ABSTRACT

Reproducing method and apparatus for reproducing highly efficiently encoded data from a record medium composed of spectrum data and scale factor data determines if address of changed highly efficient encoded data and stores it. The method and apparatus determines whether or not the address of highly efficient encoded data whose scale factor data is changed corresponding to the operating mechanism and stores it in a memory store apart from the write address by a predetermined distance. By partly changing the scale factor values and filtering process is accomplished.

10 Claims, 7 Drawing Sheets

REPRODUCING APPARATUS AND REPRODUCING METHOD

BACKGROUND OF THE INVENTION

1. Field of the Invention

The present invention relates to a digital signal processing apparatus and a digital signal processing method corresponding to a compression encoding method for an audio signal or the like.

2. Description of the Related Art

As a related art reference of a highly efficiently encoding method for an audio signal, for example, the transform encoding method is known. The transform encoding method is one type of the block segmentation frequency band division method. In the transform encoding method, a time-base audio signal is segmented into blocks at intervals of a predetermined unit time period. The time-base signal of each block is converted into a frequency-base signal (namely, orthogonally transformed). Thus, the time-base signal is divided into a plurality of frequency bands. In each frequency band, blocks are encoded. As another related art reference, the sub band coding (SBC) method as one type of the non block-segmentation frequency band dividing method is known. In the SBC method, an audio signal is divided into a plurality of frequency bands and then encoded without segmenting a time-base audio signal into blocks at intervals of a predetermined unit time period.

As another related art reference, the highly efficiently encoding method that is a combination of the band division encoding method and the SBC method is also known. In this highly efficiently encoding method, a signal of each frequency band is orthogonally transformed into a frequency-base signal corresponding to the transform encoding method. The transformed signal is encoded in each frequency band.

As an example of the orthogonal transform method, an input audio signal is segmented into blocks at intervals of a predetermined unit time period (for each frame). Each block is transformed by for example the fast Fourier transforming (FFT) method, the discrete cosine transforming (DCT) method, or the modified DCT transforming (MDCT) method. Thus, a time-base signal is converted into a frequency-base signal.

As another related art reference, an encoding method for dividing a signal into a plurality of frequency bands, performing the MDCT process for each frequency band, normalizing generated MDCT coefficients, and quantizing the normalized data is known. Thus, with this method, the encoding process can be effectively performed.

A signal that has been encoded in one of the above-described methods is decoded in the following manner. First of all, with reference to normalization information of each frequency band, transformed coefficient data such as MDCT coefficient data is generated corresponding to a highly efficiently encoded signal. Corresponding to the transformed coefficient data, so-called inversely orthogonally transforming process is performed. Thus, time-base data is generated.

When the normalization information is changed by an adding process, a subtracting process, or the like, a reproduction level adjusting function, a filtering function, and so forth can be accomplished for a time-base signal of which highly efficiently encoded data is decoded. According to this method, since the reproduction level can be adjusted by a calculating process such as an adding process or a subtracting process, the structure of the apparatus becomes simple. In addition, since a decoding process, an encoding process, and so forth are not required, the reproduction level can be adjusted without a deterioration of the signal quality. In addition, in this method, since a decoded signal is held for a predetermined time period, part of the signal generated by the decoding process can be changed.

Conventionally, the normalization information cannot be changed on real time basis in parallel with an encoding process or a decoding process. Thus, while checking the influence of a change of the normalization information against the result of the reproducing process (for example, checking whether or not a desired level is obtained), the normalization information cannot be changed.

OBJECTS AND SUMMARY OF THE INVENTION

Therefore, an object of the present invention is to provide a digital signal processing apparatus and a digital signal processing method that allow the normalization information to be changed on real time basis in parallel with an encoding process, a decoding process, or the like.

The present invention is a reproducing apparatus, comprising a reproducing means for reproducing highly efficiently encoded data from a record medium, the highly effectively encoded data being composed of spectrum data and scale factor data, a memory means for temporarily storing the highly efficiently encoded data reproduced by the reproducing means, an operating means for causing the scale factor data of the highly efficiently encoded data stored in the memory means to be changed, a memory controlling means for controlling a write address pointer and a read address pointer so that the highly effectively encoded data is intermittently written to the memory means at a first speed and highly efficiently encoded data is read from the memory means at a second speed, the second speed being lower than the first speed, a determining means for determining whether or not the address of the highly efficiently encoded data whose scale factor data is changed corresponding to the operating means and stored in the memory means is apart from the read address by a predetermined distance, and a controlling means for canceling the change of the scale factor data when the address of the highly efficiently encoded data whose scale factor data is changed corresponding to the operating means and stored in the memory means is not apart from the read address by the predetermined distance as the determined result of the determining means.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
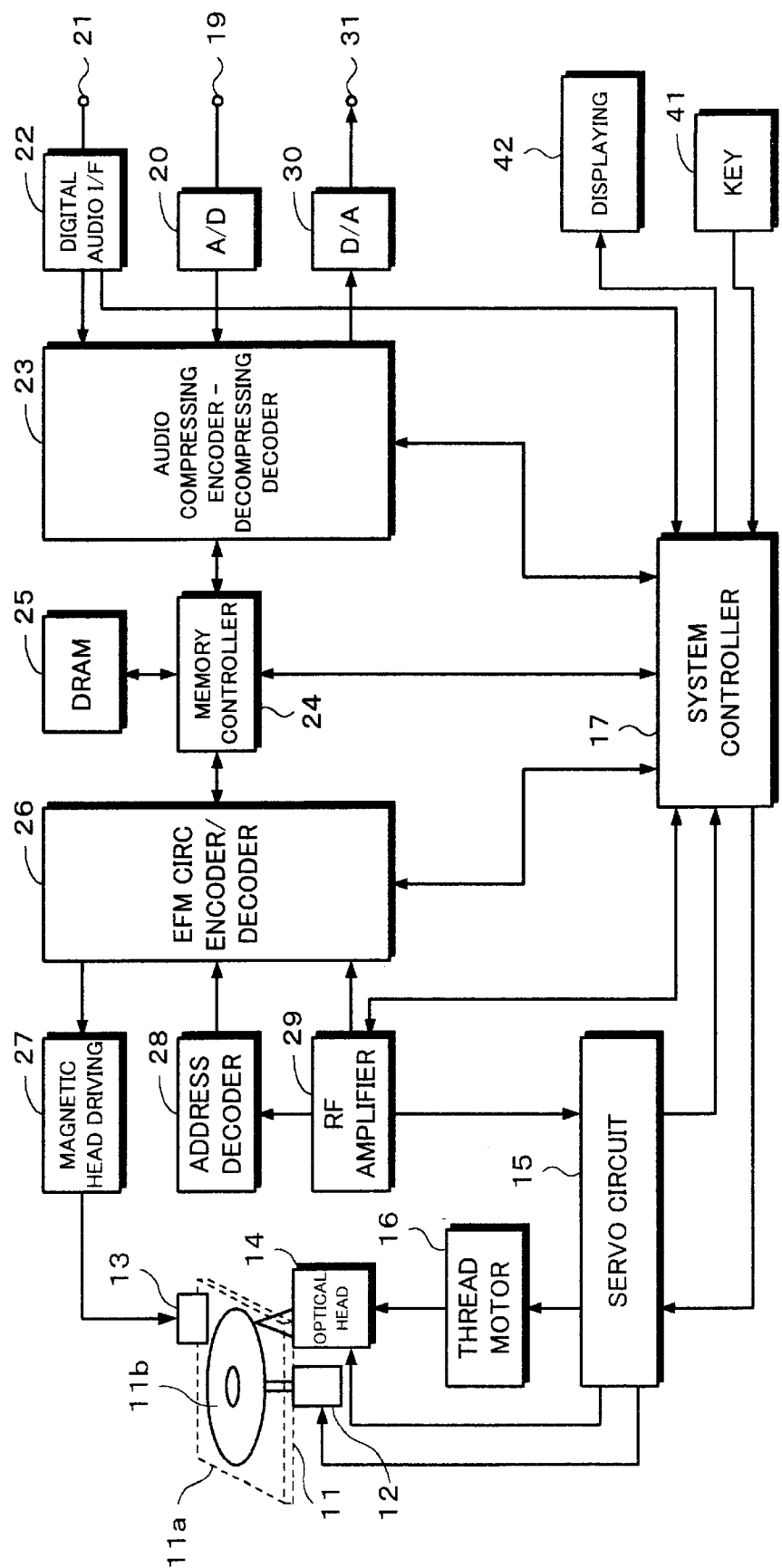
FIG. 1 is a block diagram showing the overall structure of a magneto optical recording and reproducing apparatus.

FIG. 1 is a block diagram showing the structure of a recording and reproducing apparatus according to the present invention. Referring to FIG. 1, a mini disc (MD) 11 that is a record medium is composed of a cartridge 11a and a disc 11b. The cartridge 11a houses the disc 11b. The diameter of the disc 11b is 64 mm. There are three types of MDs that are a reproduction-only optical disc, a recordable magneto optical disc, and a hybrid disc that differ from each other in their formats. The hybrid disc has a reproduction-only region and a recordable area. The reproduction-only optical disc has a TOC (Table of Contents) at the innermost periphery thereof.

The TOC contains information such as the start address and the end address of each program, the track name that is the name of each program, and the disc name that is the name of the disc. On the other hand, a magneto optical disc, which is a recordable disc, has a non-rewritable PTOC (Pre-mastered TOC) and a rewritable UTOC (User TOC). The PTOC contains information such as the start address and laser power value in record mode. The information is formed as pre-bits. The UTOC contains information for managing recorded data. The PTOC is disposed at the innermost periphery of the disc. The UTOC is disposed at the outer periphery of the PTOC. The UTOC is composed of for example 32 sectors. The PTOC contains for example the start address and the end address of each program recorded on the disc, the track name of each program, copy protect information, and emphasis information.

The disc 11b is rotated by a spindle motor 12. The cartridge 11a has a shutter. When the mini disc 11 is loaded to a predetermined position of a disc drive portion, the shutter of the mini disc 11 is opened. Thus, when the disc 11b is a recordable optical disc, a recording magnetic head 13 is disposed opposite to an upper portion of the disc 11b. An optical head 14 is disposed opposite to a lower portion of the disc 11b. When the disc 11b is a reproduction-only optical disc, only the optical head 14 is used.

Next, the structure and operation of the reproducing portion of the apparatus will be described. The optical head 14 radiates a laser beam to the disc 11b and receives the reflected light from the disc 11b. The optical head 14 converts the reflected light into an electric signal and supplies the generated electric signal as a reproduction signal to an RF amplifier 29. The RF amplifier 29 generates servo control signals (such as a focus error signal FE, a tracking error signal TE, and a spindle error signal) and an RF signal (that is audio information and so forth) corresponding to the supplied reproduction signal. The focus error signal FE and the tracking error signal TE are supplied to a servo circuit 15. The spindle error signal is supplied to a system controller 17. The RF signal is supplied to an EFM (Eight to Fourteen Modulation) and CIRC (Cross Interleave Reed-Solomon Code) encoder/decoder 26 and an address decoder 28.

The servo circuit 15 drives a focus coil (not shown) of the optical head 14 corresponding to the focus error signal FE and performs a focus controlling operation. The servo circuit 15 drives a thread motor 16 and a tracking coil (not shown) that is disposed in the optical head 14 corresponding to the tracking error signal TE so as to perform the tracking control. The system controller 17 generates control data for properly controlling the number of rotations of the spindle motor 12 corresponding to the spindle error signal. The system controller 17 supplies the control data to the servo circuit 15. The servo circuit 15 drives the spindle motor 12 corresponding to the supplied control data.

The EFM and CIRC encoder/decoder 26 performs an EFM demodulating process corresponding to the RF signal supplied from the RF amplifier 29. In addition, the EFM and CIRC encoder/decoder 26 performs an error correcting process corresponding to the CIRC method. The resultant signal is supplied from the EFM and CIRC encoder/decoder 26 to a memory controller 24. The memory controller 24 temporarily stores the signal supplied from the EFM and CIRC encoder/decoder 26 to a DRAM (Dynamic Random Access Memory) 25. Thereafter, the signal is read from the DRAM 25 and supplied to the audio compressing encoder—decompressing decoder 23. The DRAM 25 has a storage capacity of one cluster or more. One cluster is a write data unit of a magneto optical disc (for example, one cluster is 1 Mbits).

When data is reproduced, the data write rate of the DRAM 25 is 1.4 Mbps. Thus, it takes 0.9 seconds to fully write data to the DRAM 25. To prevent the DRAM 25 from overflowing, data is intermittently written thereto in consideration of the remaining storage capacity thereof. The data read rate of the DRAM 25 is 0.3 Mbps. When data is fully written to the DRAM 25, the data amount of the written data is equivalent to three seconds of reproduction audio data. Thus, in this case, even if the accessing operation of the disc 11b stops due to an external disturbance such as vibration applied to the apparatus, the reproduction audio data can be output for around three seconds. In this time period, if the servo operation is correctly performed and the accessing operation becomes normal, the reproduction audio data does not break. The write address and read address to/from the DRAM 25 are controlled by the memory controller 24.

The audio compressing encoder—decompressing decoder 23 performs a decoding process (decompressing process) corresponding to the compression-encoding process that will be descried later. At this point, as a parameter for a normalizing process performed in the compression-encoding process, scale factor information is referenced. Thus, before a signal is supplied to the audio compressing encoder—decompressing decoder 23, when scale factor information is changed, the level adjustment, the filtering process, and so forth can be performed in parallel with the reproducing process. An output signal of the audio compressing encoder—decompressing decoder 23 is supplied to a D/A converter 30. The D/A converter 30 converts the decoded signal supplied as a digital signal from the audio compressing encoder—decompressing decoder 23 into an analog signal. An output signal of the A/D converter 30 is supplied to a speaker through an output terminal 31. The speaker generates an audio sound of the reproduced signal.

The address decoder 28 detects addresses corresponding to the supplied signal. The addresses are recorded as a wobbled group at a predetermined frequency of for example 22.05 Hz along a track of the disc 11b. The detected addresses are supplied to the EFM and CIRC encoder/decoder 26 and referenced in the reproducing operation and recording operation.

Next, the structure and the operation of the recording portion of the apparatus will be described. As record data, the case that a digital audio signal is supplied will be described. The digital audio signal is supplied to a digital audio interface 22 through an input terminal 21. The digital audio interface 22 separates the digital audio signal into a signal of audio information and a signal of the other portion. The signal of the audio information is supplied to the audio compressing encoder—decompressing decoder 23. The signal of other than the audio information contains error correction bits and user's bits. The signal of other than the audio information is supplied to the system controller 17.

The audio compressing encoder—decompressing decoder 23 performs an encoding process including MDCT (Modified Discrete Cosine Transfer) process for the signal supplied from the digital audio interface 22 and compresses the data amount of the supplied signal with a compression rate of around 1 to 5. At this point, to effectively compress the signal, a bit allocating process using the sense of hearing of human beings and processes for dividing a supplied signal into several frequency bands, performing the MDCT process for each frequency band, normalizing the resultant conversion coefficients, and quantizing the results are performed.

An output signal of the audio compressing encoder—decompressing decoder 23 is supplied to the memory controller 24. The memory controller 24 temporarily stores the compressed digital signal supplied from the audio compressing encoder—decompressing decoder 23 to the DRAM 25 having a storage capacity of one cluster or more. Thereafter, the signal stored in the DRAM 25 is supplied to the EFM and CIRC encoder/decoder 26. The EFM and CIRC encoder/decoder 26 performs the CIRC process as an error correction code encoding process and then the EFM process as a record time modulating process for the signal supplied from the memory controller 24. Thus, record data is generated. The record data is supplied to a magnetic head driving circuit 27.

The magnetic head driving circuit 27 drives the magnetic head 13 corresponding to the supplied record data. Thus, a magnetic field modulated by the record data is applied to the disc 11b. In synchronization of the applied magnetic field, the optical head 14 radiates a laser beam that is higher than in the reproducing operation to the disc 11b. Thus, the temperature of the record surface of the MD 11a is raised to the Curie temperature. As a result, the inversion of magnetic field takes place. Thus, the signal is recorded. The servo controlling process and the address detecting process in the recording operation are almost the same as those in the reproducing operation.

In the above description, as record data, a digital audio signal in a predetermined format is supplied. However, it should be noted that the embodiment of the present invention can be applied to a recording operation for an analog signal. In other words, an analog signal is supplied through an input terminal 19. An A/D converter 20 samples the analog signal at a frequency of for example 44.1 kHz so as to convert the analog signal into a digital signal. The digital signal that is output from the A/D converter 20 is supplied to the audio compressing encoder decompressing decoder 23.

In this case, the record data is recorded as clusters to the disc 11b. One cluster is composed of 36 sectors. One sector is composed of 5.5 sound groups. One sound group is composed of data of 424 bytes. One sound group is composed of two sound frames of left and right channels. One sound frame is composed of 212 bytes. In real record data, 32 sectors of 36 sectors of one cluster are used to record audio information. The remaining four sectors are used as a linking area for adjusting an operation timing for the rise of the magnetic field of the magnetic head and the controlling operation of the laser power. Alternatively, three sectors of the remaining four sectors are used as a linking area, whereas the remaining one sector is used as a sub data area.

The reproduction-only MD does not have such a linking area. The first four sectors of each cluster of the reproduction-only MD are used as an area for sub data such as graphic information. In addition, on the reproduction-only MD, data is physically formed as pits. Thus, unless the disc is physically destroyed, data is not destroyed with a user's improper operation.

The system controller 17 manages the operation of each structural portion of the apparatus so that the apparatus correctly operates corresponding to an operation command issued by the user or the like through a key portion 41. The key portion 41 has a power key, an eject key, a playback key, a pause key, a stop key, a program selection key, a record key, and so forth. The key portion 41 also has an operation key for changing normalization information contained in a compressed digital signal reproduced by the disc 11b (the detail of the normalization information will be described later). A displaying portion 42 is connected to the system controller 17. The displaying portion 42 displays information of the reproducing state. The displaying portion 42 displays the total play time of the MD 11, the elapsed time of the current program, the remaining play time of the current program, the remaining time of all the programs, the track number of the current program, and so forth. When a disc name, track names, information about audio data, information of record date and time of the disc 11b have been recorded, the displaying portion 42 displays such information.

It should be noted that the key portion 41 is not limited to such an operation panel disposed on the apparatus. Alternatively, a remote controller using for example an infra red ray may be used. In addition, as the key portion 41 and the displaying portion 42, a personal computer or the like may be used.

Figure 2:
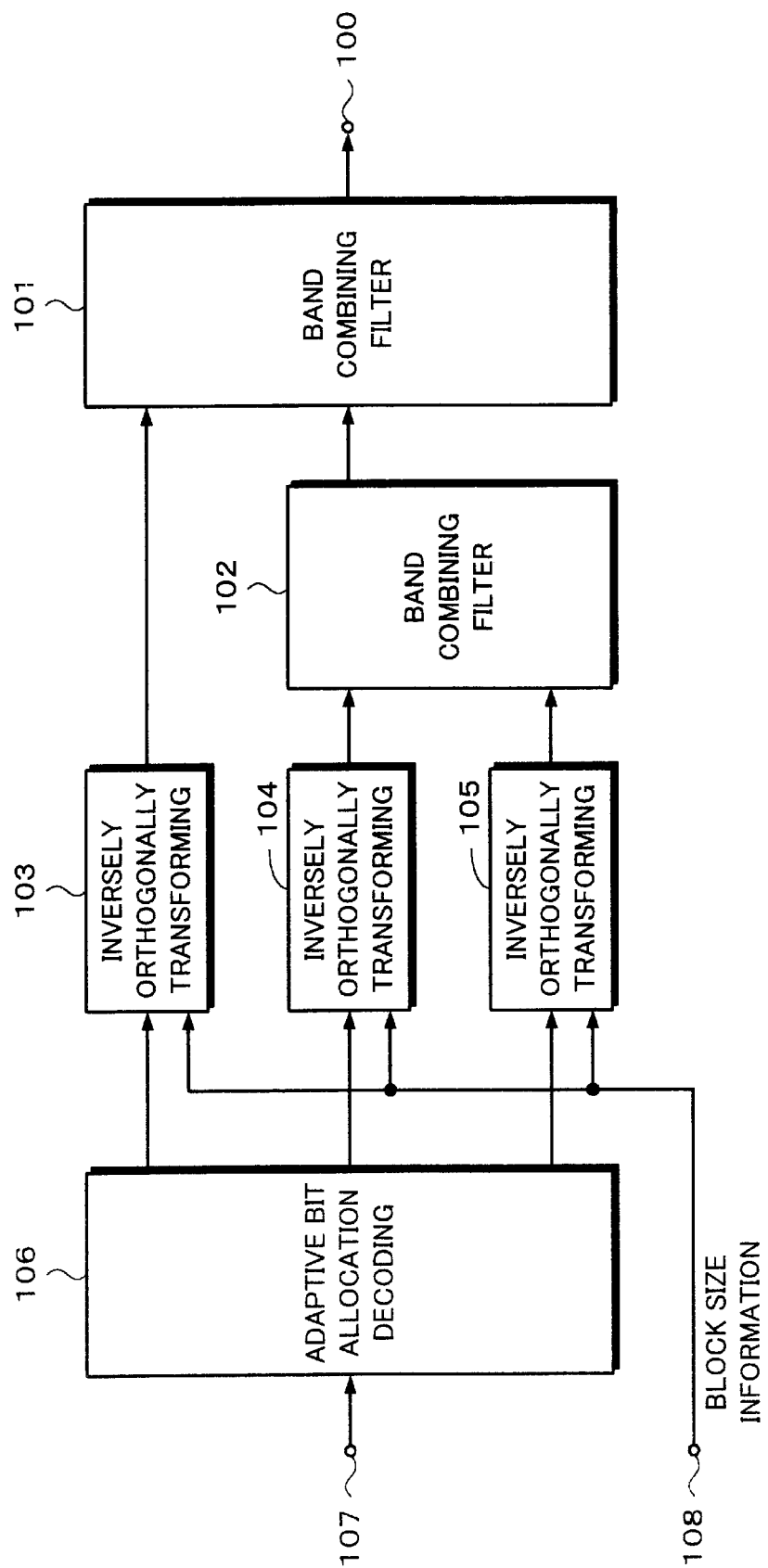
FIG. 2 is a block diagram showing the structure of an audio compressing encoder—decompressing decoder 23 that performs a decoding process.

Next, a real process of the audio compressing encoder—decompressing decoder 23 will be described. A compressed digital signal is reproduced from the disc 11b and supplied to the EFM and CIRC encoder/decoder 26. The EFM and CIRC encoder/decoder 26 decodes the digital signal and supplies the decoded signal to the audio compressing encoder—decompressing decoder 23 through the memory controller 24 and the DRAM 25. FIG. 2 shows the structure of the block that performs the decoding process. Referring to FIG. 2, encoded data that is reproduced from the disc 11b through the memory controller 24 is supplied to an input terminal 107. In addition, block size information used in the encoding process is supplied to an input terminal 108.

The encoded data is supplied from the input terminal 107 to a calculating device 110. The calculating device 110 also receives numeric data from a normalization information changing circuit 119. The calculating device 110 adds the numeral data supplied from the normalization information changing circuit 119 to the scale factor information contained in the encoded data. When the numeric value that is output from the normalization information changing circuit 119 is a negative value, the calculating device 110 operates as a subtracting device. An output signal of the calculating device 110 is supplied to an adaptive bit allocation decoding circuit 106 and an output terminal 111.

The adaptive bit allocation decoding circuit 106 references the adaptive bit allocation information and deallocates the allocated bits. An output signal of the adaptive bit allocation decoding circuit 106 is supplied to inversely orthogonally transforming circuits 103, 104, and 105. The inversely orthogonally transforming circuits 103, 104, and 105 transform a frequency-base signal into a time-basis signal. An output signal of the inversely orthogonally transforming circuit 103 is supplied to a band combining filter 101. Output signals of the inversely orthogonally transforming circuit 104 and 105 are supplied to a band combining filter 102. Each of the inversely orthogonally transforming circuits 103, 104, and 105 is composed of an inversely modified DCT transforming circuit (IMDCT).

The band combining filter 102 combines supplied signals and supplies the combined result to the band combining filter 101. The band combining filter 101 combines supplied signals and supplies the combined result to a terminal 100. In such a manner, time-base signals of separated bands that are output from the inversely orthogonally transforming circuits 103, 104, and 105 are decoded into a signal of the entire band.

Each of the band combining filters 101 and 102 may be composed of for example an IQMF (Inverse Quadrature Mirror Filter).

Figure 5:
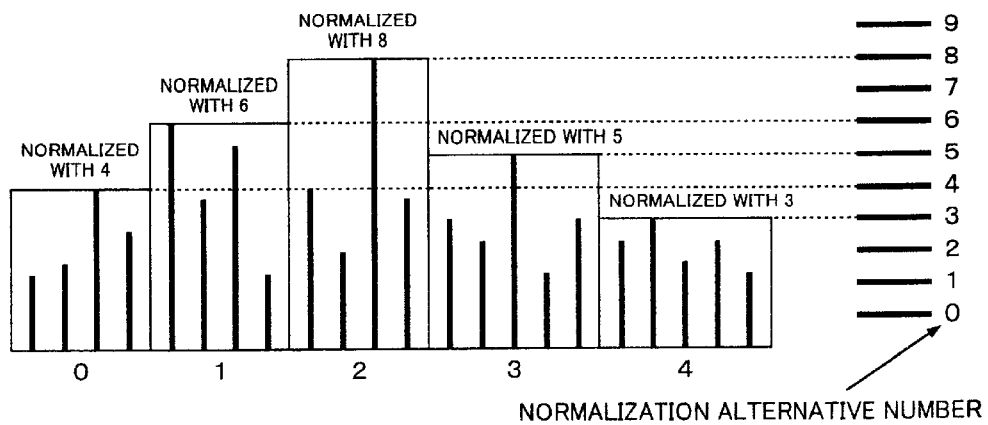
FIG. 5 is a schematic diagram showing an example of which scale factor values are equally attenuated in the entire sound frame.
Figure 6:
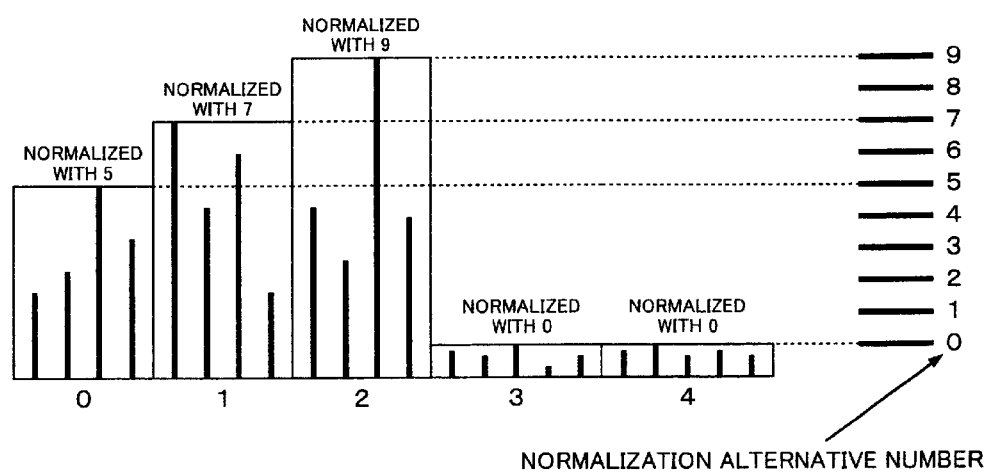
FIG. 6 is a schematic diagram showing an example of which scale factor values are attenuated in a part of a sound frame.

A normalizing process for accomplishing a level adjusting process or a filtering process as shown in FIGS. 5 and 6 is performed for encoded data that is input to the input terminal 107 shown in FIG. 2 by the DRAM 25.

Figure 7:
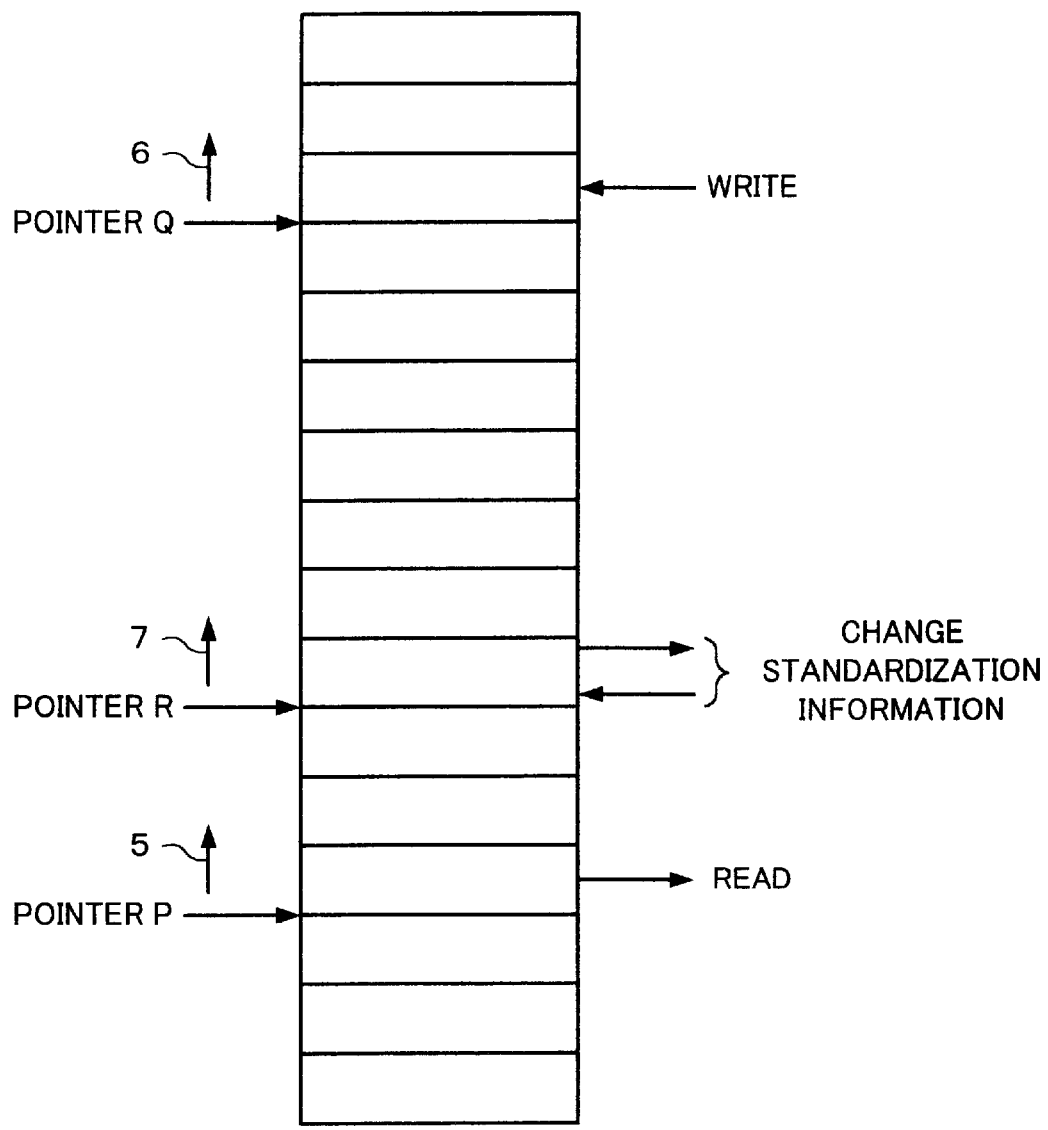
FIG. 7 is a memory map of which scale factor values stored in a DRAM 25 are changed.

The normalizing process performed in the DRAM 25 will be described with reference to FIG. 7.

Figure 3:
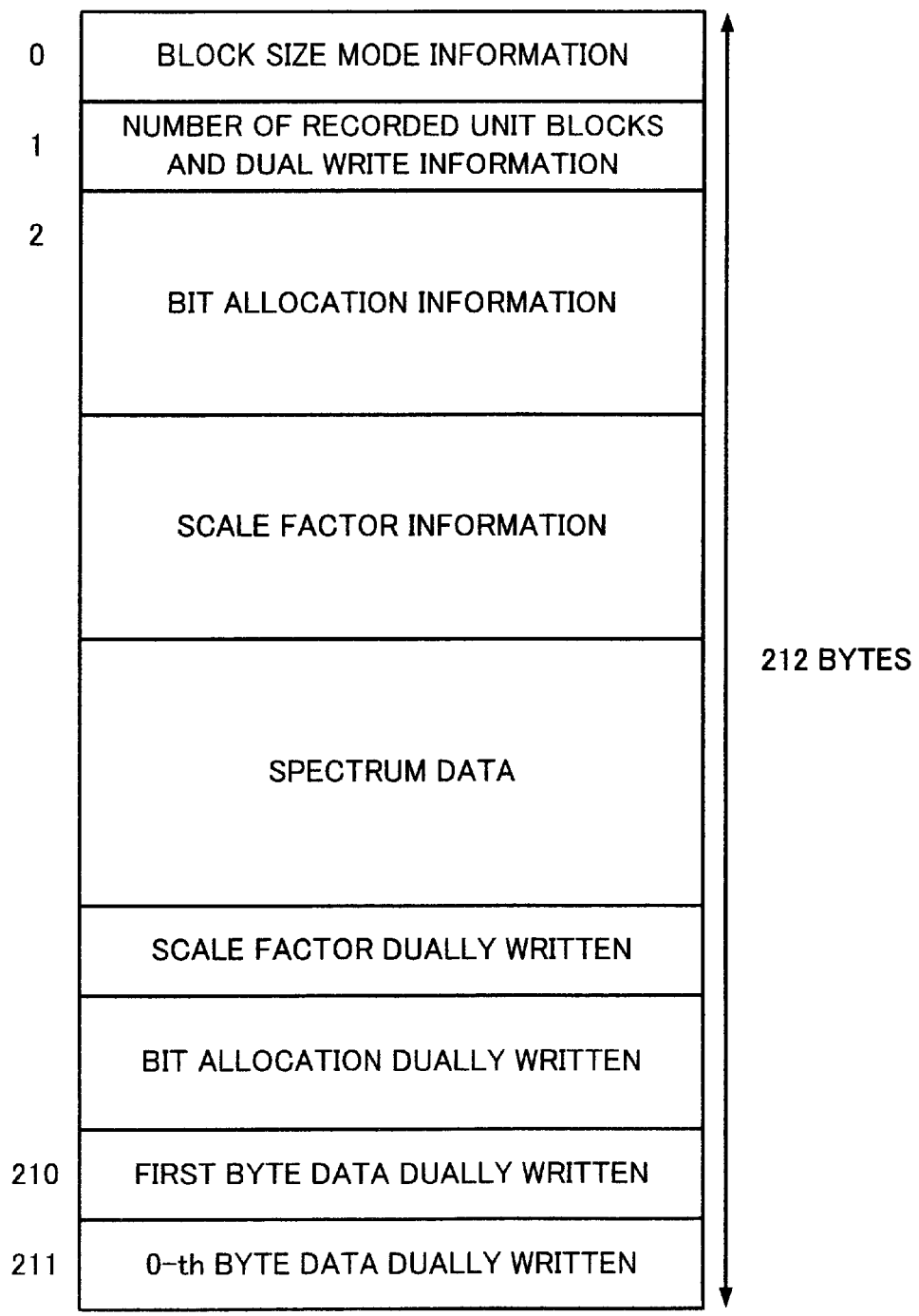
FIG. 3 is a schematic diagram showing the data structure of a unit sound frame.

FIG. 3 is a schematic diagram showing the data structure of encoded data that is read from the disc 11b and stored to the DRAM 25.

In FIG. 3, numeric values 0, 1, 2, . . . , 211 on the left side represent bytes. In this example, one frame is composed of 212 bytes.

Block size information of each of three divided regions of a low band region, a middle band region, and a high band region is placed. At the first byte position, information that represents the number of unit blocks that are recorded is placed. In the high band region, the probability of which no bits are allocated to unit blocks and thereby they are not recorded becomes high. Thus, to deal with such a situation, the number of unit blocks is designated in such a manner that more bits are allocated to the middle band region and the low band region that largely affect the sense of hearing than the high band region.

In addition, at the first byte position, the number of unit blocks in which bit allocation information is dually written and the number of unit blocks in which scale factor information is dually written are placed.

To correct an error, the same information is dually written. In other words, data recorded at a particular byte is dually recorded to another byte. Although the strength against an error is proportional to the amount of data that is dually written, the amount of data used for spectrum data decreases. In the example of the encoding format, since the number of unit blocks in which bit allocation information is dually written and the number of unit blocks in which scale factor information is dually written are independently designated, the strength against an error and the number of bits used for spectrum data can be optimized. The relation between a code in a predetermined bit and the number of unit blocks has been defined as a format.

At the second byte position shown in FIG. 3, the bit allocation information of each unit block is placed. One unit block is composed of four bites. Thus, the bit allocation information for the number of unit blocks starting with 0-th unit block is placed. The bit allocation information is followed by scale factor information of each unit block. For the scale factor information, six bits are used for each unit block. Thus, the scale factor information for the number of unit blocks starting with the 0-th unit block is placed.

The scale factor information is followed by spectrum data of each unit block. The spectrum data for the number of unit blocks that are really recorded is placed. Since the data amount of spectrum data contained in each unit block has been defined as a format, with the bit allocation information, the relation of data can be obtained. When the number of bits allocated to a particular unit block is zero, the unit block is not recorded.

The spectrum information is followed by the scale factor that is dually written and the bit allocation information that is dually written. At the last byte (211-st byte) and the second last byte (210-th byte), information at the 0-th byte and information at the first byte are dually written. The two bytes in which such information is dually written has been defined as a format. However, scale factor information that is dually written and the bit allocation information that is dually written cannot be changed.

One frame contains 1024 PCM samples that are supplied through an input terminal. The first 512 samples are used in the immediately preceding frame. The last 512 samples are used in the immediately following frame. This arrangement is used from a view point of an overlap of the MDCT process.

Figure 4:
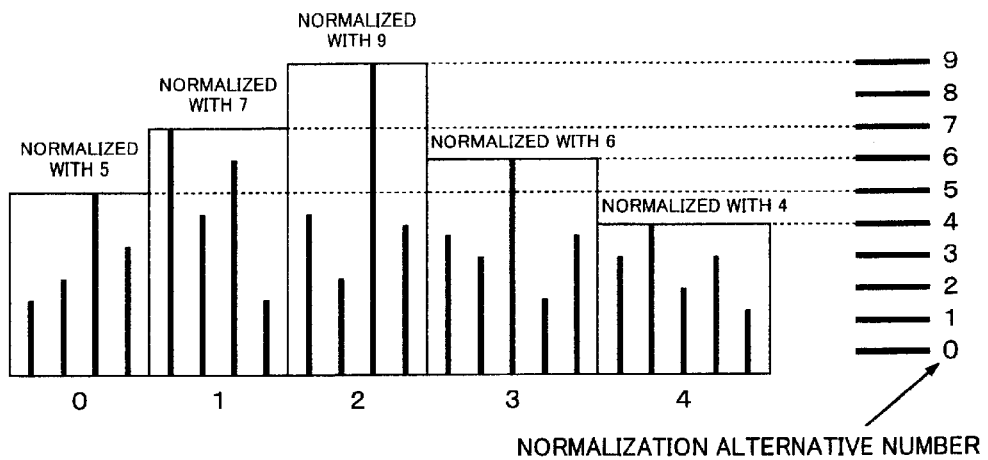
FIG. 4 is a schematic diagram showing scale factor values that are set to a unit sound frame.

According to the embodiment, by changing the scale factor information contained in compressed data stored in the DRAM 25, for example the reproduction level adjusting process and the filtering process can be performed on real time basis. Next, these processes will be described in detail. FIG. 4 shows an example of a normalizing process in the case that the number of unit blocks per sound block is five (block 0 to block 4) (each unit block is a set of conversion coefficients corresponding to divided bands), that the number of scale factors is 10, and that the number of values that represent the scale factor information is 10 (scale factor values 0 to 9).

The scale factor value corresponding to the maximum conversion coefficient of each unit block is selected. The selected scale factor value is used as scale factor information of the current unit block. In FIG. 4, the value of the scale factor information of the block 0 is 5. The value of the scale factor information of the block 1 is 7. Likewise, the other blocks are correlated with scale factor information. The scale factor information is written to a predetermined position of compressed data.

When "1" is subtracted from the scale factor information values of all the unit blocks shown in FIG. 4, a level adjusting process of which the level of all the sound frame is lowered by for example 2 dB is performed as shown in FIG. 5. On the other hand, when "2" is added to the scale factor information values of all the unit blocks, a level adjusting process of which the level of all the sound frame is raised by for example 4 dB is performed. In addition, when the scale factor information values of the blocks 3 and 4 are set to "0", a filtering process of which for example the high band region of the sound block is cut is performed as shown in FIG. 6. Alternatively, the scale factor information value of a unit block to be cut may be subtracted from the other unit blocks. Alternatively, the scale factor information value of a unit block to be cut may be forcedly set to "0".

In the above-descried example, for simplicity, it was assumed that the number of unit blocks per sound frame is five and that the number of scale factor information values is 10 (values 0 to 9). However, in the format of the MD (Mini-Disc) that is a magneto optical disc as an example of a real record medium, the number of unit blocks is 52 (unit block 0 to unit block 51) and the number of normalization alternatives is 64 (normalization alternative 0 to normalization alternative 63). In this case, by changing the scale factor information values, the level adjusting process and the filtering process can be more accurately performed.

Next, the scale factor changing process according to the embodiment of the present invention will be described. First of all, with reference to FIG. 7, the writing/reading operations to/from the DRAM 25 in the reproducing mode will be described. In FIG. 7, pointer P represents the position of a sector that is read to the audio compressing encoder—decompressing decoder 23. Pointer Q represents the position of a sector that is written from the EFM and CIRC encoder/decoder 26. Pointer R represents the position of a sector at which a scale factor as normalization information contained in compressed data stored in the DRAM 25 is changed. A scale factor is changed in the following manner. The system controller 17 reads a scale factor from the DRAM 25 through the memory controller 24, temporarily stores the scale factor, changes the scale factor corresponding to a user's command that is input through the key portion 41, and rewrites the changed scale factor to the DRAM 25.

When compressed data for one sector is written to the DRAM 25 in the reproducing mode, the scale factor changing process is performed. As the reproducing operation progresses, the pointers P, Q, and R advance in the storage area of the DRAM 25 as denoted by arrows 5, 6, and 7, respectively. When the pointer R overtakes the pointer Q or when the pointer R is apart from the pointer P by a predetermined number of sectors, the scale factor changing process is temporarily stopped. Thereafter, when the pointer R is sufficiently apart from the pointer Q and the pointer R is close to the pointer P within a predetermined number of sectors, the scale factor changing process for the pointer R is resumed. In these operations, the pointer R is kept at a proper position against the pointers P and Q. Thus, the scale factor is changed on real time basis.

Figure 8:
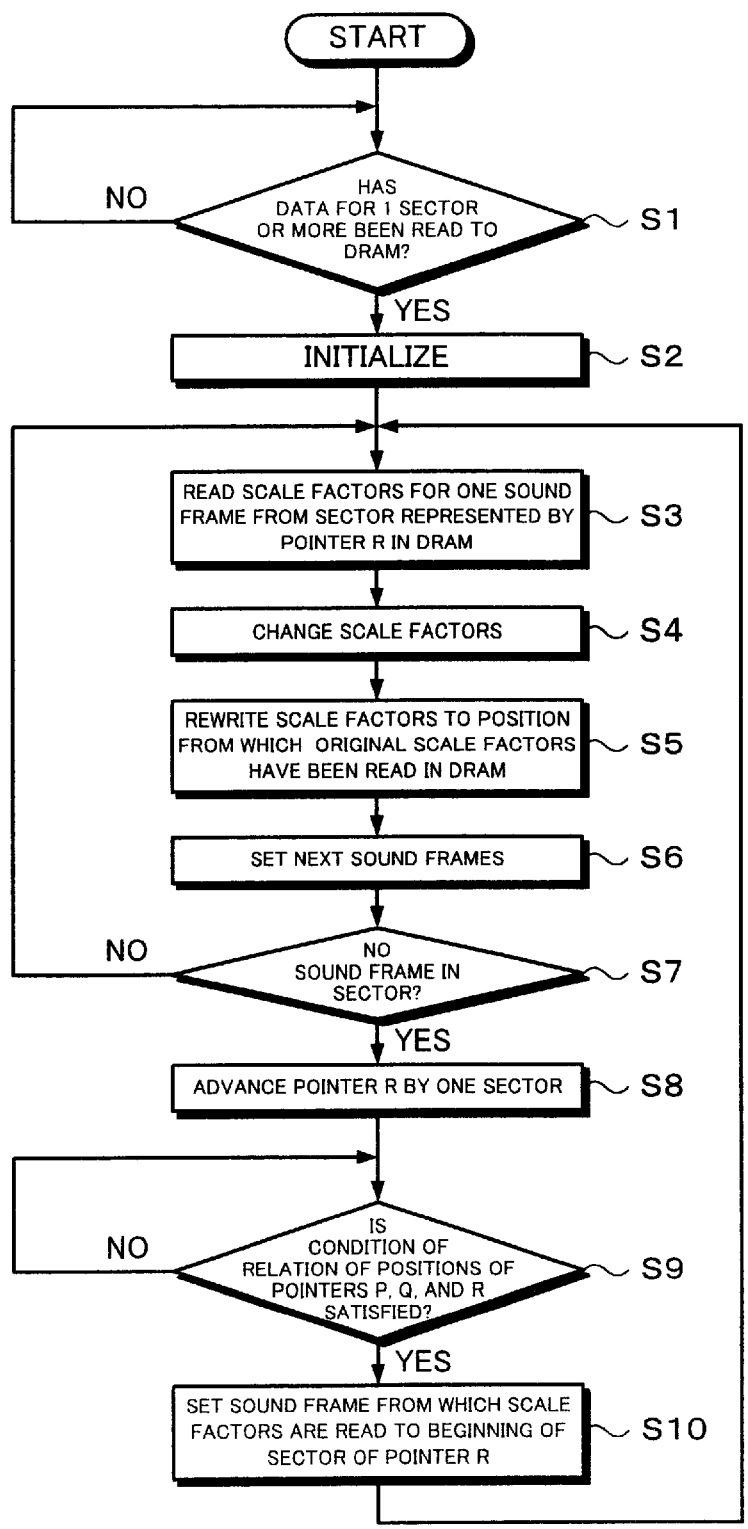
FIG. 8 is a flow chart showing a process for changing scale factor data stored in the DRAM 25.

FIG. 8 is a flow hart showing a real example of the scale factor changing process. At step S1, it is determined whether or not compressed data for one sector or more has been read to the DRAM 25. When the determined result at step S1 is Yes (namely, compressed data for one sector or more has been read to the DRAM 25), the flow advances to step S2. Otherwise, the flow returns to step S1. At step S2, a memory for changing scale factors is initialized in the system controller 17. Thereafter, the flow advances to step S3. At step S3, scale factors for one sound frame are read from a sector represented by the pointer R of the DRAM 25 to a predetermined memory of the system controller 17. Thereafter, the flow advances to step S4. As was described above, one sector contains 5.5 sound groups that are 11 sound frames. At step S4, the scale factors that have been read at step S3 are changed corresponding to a user's command. Thereafter, the flow advances to step S5.

At step S5, the changed scale factors are rewritten to the position from which the original scale factors have been read at step S3. Thereafter, the flow advances to step S6. At step S6, the next sound frames are set. Thereafter, the flow advances to step S7. At step S7, it is determined whether or not the scale factor changing process has been completed for all the sound frames of the sector represented by the pointer R in the DRAM 25. When the determined result at step S7 is Yes (namely, the scale factor changing process has been completed), the flow advances to step S8. Otherwise, the flow returns to step S3.

At step S8, the pointer R is advanced by one sector. Thereafter, the flow advances to step S9. At step S9, it is determined whether or not the above-described relation of the pointers P, Q, and R is satisfied (namely, the conditions that the pointer R is sufficiently apart from the pointer Q and that the pointer R is close to the pointer P within a predetermined number of sectors are satisfied). When the determined result at step S9 is Yes (namely, the relation is satisfied), the flow advances to step S10. Otherwise, the flow returns to step S9. Thus, until the conditions are satisfied, the process is suspended. At step S10, a sound frame from which a scale factor is read is set at the beginning of the sector of the pointer R.

In the above-described embodiment, scale factor information contained in data stored in a memory is changed in a decoding process for decompressing a compressed code in the reproducing operation. Alternatively, scale factor information contained in data stored in a memory may be changed in an encoding process for compressing a code in the recording operation.

According to the present invention, in an encoding process, a decoding process, or the like, normalization information is changed in a blank period of a data writing process and a data reading process for a predetermined memory. Thus, for example, a level adjusting process, a filtering process, and so forth can be performed by changing normalization information on real time basis in parallel with an encoding process, a decoding process, or the like.

Thus, while checking the influence of a change of normalization information against reproduced result (for example, while checking whether or not a desired level has been obtained), normalization information can be changed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproducing apparatus, comprising:

reproducing means for reproducing highly efficiently encoded data from a record medium, the highly effectively encoded data being composed of spectrum data and scale factor data;

memory means for temporarily storing the highly efficiently encoded data reproduced by said reproducing means;

operating means for causing the scale factor data of the highly efficiently encoded data stored in said memory means to be changed;

memory controlling means for controlling a write address pointer and a read address pointer so that the highly effectively encoded data is intermittently written to said memory means at a first speed and highly efficiently encoded data is read from said memory means at a second speed, the second speed being lower than the first speed;

determining means for determining whether or not the address of the highly efficiently encoded data whose scale factor data is changed corresponding to said operating means and stored in said memory means is apart from the read address by a predetermined distance; and controlling means for canceling the change of the scale factor data when the address of the highly efficiently encoded data whose scale factor data is changed corresponding to said operating means and stored in said memory means is not apart from the read address by the predetermined distance as the determined result of said determining means.

2. The reproducing apparatus as set forth in claim 1, further comprising:

second determining means for determining whether or not the address of the highly efficiently encoded data whose scale factor data is changed corresponding to said operating means and stored in said storing means is apart from the write address by a predetermined distance.

3. The reproducing apparatus as set forth in claim 2, wherein when the address of the highly effectively encoded data whose scale factor data is changed corresponding to said operating means and stored in said storing means is not apart from the write address by the predetermined distance as the determined result of said second determining means, said controlling means cancels the change of the scale factor data.

4. The reproducing apparatus as set forth in claim 1, wherein the scale factor data is composed of a plurality of scale factor values, and wherein by partly changing the scale factor values, a filtering process is accomplished.

5. The reproducing apparatus as set forth in claim 1, wherein the scale factor data is composed of a plurality of scale factor values, and wherein by equally decreasing the scale factor values, a level controlling process is accomplished.

6. A reproducing method, comprising the steps of:

(a) reproducing highly efficiently encoded data from a record medium, the highly effectively encoded data being composed of spectrum data and scale factor data;

(b) temporarily storing the highly efficiently encoded data reproduced at step (a) to a memory;

(c) controlling a write address pointer and a read address pointer so that the highly efficiently encoded data is intermittently written to the memory at a first speed corresponding to a user's change command for scale factor data contained in the highly efficiently encoded data stored in the memory and the highly efficiently encoded data is read from the memory at a second speed, the second speed being lower than the first speed;

(d) determining whether or not the address of the highly efficiently encoded data whose scale factor data is changed corresponding to the user's command and stored in the memory is apart from the read address by a predetermined distance; and (e) canceling the change of the scale factor data when the address of the highly efficiently encoded data whose scale factor data is changed corresponding to the user's command and stored in the memory is not apart from the read address by the predetermined distance as the determined result at step (d).

7. The reproducing method as set forth in claim 6, further comprising the step of:

(f) determining whether or not the address of the highly efficiently encoded data whose scale factor data is changed corresponding to the user's command and stored in the memory is apart from the write address by a predetermined distance.

8. The reproducing method as set forth in claim 7, wherein when the address of the highly effectively encoded data whose scale factor data is changed corresponding to the user's command and stored in the memory is not apart from the write address by the predetermined distance as the determined result at step (f), the change of the scale factor data is canceled.

9. The reproducing method as set forth in claim 6, wherein the scale factor data is composed of a plurality of scale factor values, and wherein by partly changing the scale factor values, a filtering process is accomplished.

10. The reproducing method as set forth in claim 6, wherein the scale factor data is composed of a plurality of scale factor values, and wherein by equally decreasing the scale factor values, a level controlling process is accomplished.

* * * * *